United States Patent [19]

Tozoni

[11] Patent Number: 5,140,208
[45] Date of Patent: Aug. 18, 1992

[54] SELF-ADJUSTING MAGNETIC GUIDANCE SYSTEM FOR LEVITATED VEHICLE GUIDEWAY

[75] Inventor: Oleg Tozoni, Rockville, Md.

[73] Assignee: Maglev Technology, Inc., Gaithersburg, Md.

[21] Appl. No.: 691,431

[22] Filed: Apr. 25, 1991

[51] Int. Cl.$^5$ ............... H02K 7/09; B60L 13/04; B61B 13/08
[52] U.S. Cl. .................. 310/90.5; 104/281; 310/12
[58] Field of Search .......... 310/12, 90.5; 104/281, 104/282, 283, 286

[56] References Cited

U.S. PATENT DOCUMENTS

| | | | |
|---|---|---|---|
| 3,842,753 | 10/1974 | Theodore et al. | 310/90.5 |
| 3,937,148 | 2/1976 | Simpson | 310/90.5 |
| 3,939,776 | 2/1976 | Ross et al. | 310/90.5 |
| 3,976,333 | 8/1976 | Sabnis | 310/90.5 |
| 4,711,182 | 12/1987 | Alexandrov et al. | 104/283 |
| 5,043,615 | 8/1991 | Oshima | 310/90.5 |
| 5,067,415 | 11/1991 | Morishita et al. | 104/281 |

FOREIGN PATENT DOCUMENTS

| | | | |
|---|---|---|---|
| 57-54718 | 4/1982 | Japan | 310/90.5 |
| 1-177804 | 7/1989 | Japan | |
| 630711 | 8/1978 | U.S.S.R. | 310/90.5 |
| 627002 | 10/1978 | U.S.S.R. | 104/281 |

Primary Examiner—Steven L. Stephan
Assistant Examiner—D. L. Rebsch
Attorney, Agent, or Firm—Kenyon & Kenyon

[57] ABSTRACT

A non-contact self-adjusting magnetic guidance device for stabilizing the trajectory of a vehicle suspended in a magnetic field includes a guidance device extending along the guideway which determines the direction of movement of the vehicle. A magnetic unit has permanent magnets, of which has a longitudinal axis. The magnets, each of which is magnetized along its longitudinal axis, are coupled to an undercarriage of the vehicle and are disposed along a horizontal axis of the vehicle, and create opposite magnetic forces that align the trajectory of the vehicle during movement. A regulating mechanism monitors the magnitude of a vertical magnetic force exerted on the magnetic unit, and the regulating mechanism automatically reduces the difference between the vertical magnetic forces to zero.

16 Claims, 6 Drawing Sheets

SELF-ADJUSTING MAGNETIC GUIDANCE SYSTEM FOR LEVITATED VEHICLE GUIDEWAY

BACKGROUND OF THE INVENTION

The invention relates generally to self-adjusting magnetic guidance devices and more particularly to a self-adjusting magnetic guidance device for stabilizing the trajectory of a vehicle suspended in a magnetic field.

The difficulties involved in developing non-contact devices to stabilize the trajectory of a vehicle suspended in a magnetic field became apparent in the 1960s, when high-speed ground transportation systems utilizing magnetic suspension were initially planned.

Several solutions to this problem have been proposed. At the present time, the following approaches are under development or being tested:

1. Electromagnets positioned on the vehicle are attracted to steel rails (i.e., strips) extending along both sides of the entire vehicle guideway.

2. Electromagnets or permanent magnets disposed on the vehicle are repelled by non-magnetic metal strips extending along both sides of the guideway.

Known devices utilizing the first approach require the following components on-board the vehicle itself: a) a highly-responsive regulating system that maintains precise control of the width of the air gaps between the poles of the electromagnets and the steel rails; and b) a powerful source of electric current. Any irregularity in either the regulating system or the power supply could lead to a serious accident.

A device utilizing the second approach is self-regulating and therefore more reliable than the first approach. A stabilizing force is created which increases in strength when there is an increase in the degree of deflection of the vehicle from the trajectory assigned it by the metal conducting strips. As the magnets move along the conducting strips, eddy currents are induced in the strips, creating electromagnetic forces which repulse and brake. For this reason the operation of the stabilizing device requires the expenditure of some of the power from the propulsion motor. This fraction of the power used to overcome electromagnetic braking is equal to the motor power losses dissipated in the form of heat in the conducting strips.

In view of the prior art, there is a need for a self-adjusting magnetic guidance device that overcomes the above-mentioned problems.

SUMMARY OF THE INVENTION

The invention solves these problems by providing a magnetic device for aligning the trajectory of a high-speed ground vehicle suspended in a magnetic field and moving in a predetermined direction along a guideway. The device includes a guidance device extending along the guideway which determines the direction of movement of the vehicle. A magnetic unit has a plurality of permanent magnets which each have a longitudinal axis. The magnets are coupled to an undercarriage of the vehicle and are disposed along a horizontal axis of the vehicle, creating magnetic forces that align the trajectory of the vehicle during movement. A regulating mechanism monitors the magnitude of a vertical magnetic force exerted on the magnetic unit, and the regulating mechanism automatically reduces the difference between the vertical magnetic forces to zero.

The non-contact self-regulating magnetic device magnetically aligns the trajectory of a vehicle suspended in a magnetic field that is moving in a predetermined direction. The device automatically responds to small horizontal deviations in the vehicle's predetermined trajectory and creates forces necessary to return the vehicle to its predetermined direction. The device utilizes attractive forces between the moving permanent magnets and fixed, steel laminated bodies.

The stationary part of the invention includes long, steel laminated cores, cylindrical in form, having a box-like (⊔) cross-section, which are rigidly attached to the guideway's concrete foundation along its entire length. The generating lines of the core's cylinders determine the direction of the vehicle's movement at each point along the guideway.

The mobile part of the invention includes a magnetic unit having permanent magnets in the form of long strips (parallelepipeds) with a rectangular cross-section, which are located along the vehicle's horizontal axis and correspond to the direction of its movement. These magnets are attached to the vehicle's undercarriage and are magnetized vertically. When attracted to the steel cores, the magnets create horizontal stabilizing forces which align the vehicle's trajectory in the predetermined direction.

The invention also includes a regulating mechanism — an automatic regulator with negative feedback to monitor the magnitude of the difference between vertical components of the forces attracting the permanent magnets to the steel cores. The regulating mechanism also attempts to reduce the difference of vertical forces to zero.

In contrast to other configurations which utilize the attraction of magnets to steel bodies, the present invention utilizes forces of attraction that increase rather than decrease (as is usually the case) as the distance between the magnets and the cores increases. This advantageous feature of the invention is achieved by the configuration and the position of the magnets and cores, which is continuously maintained by the automatic regulator.

If the moving vehicle is deflected from its predetermined direction as a result of accidental external disturbing forces or internal destabilizing forces, the permanent magnets, rigidly attached to the vehicles, move away from the cores. When this happens, there is created within the proposed mechanism an opposing force which attracts the magnets (and with them the vehicle) to the cores. The more the vehicle deviates from the trajectory predetermined by the cores, the greater is the magnitude of this force.

Once the size of the magnets and the cores are chosen so that the magnitude of the mutually attracting forces exceeds the magnitude of any potential disturbing forces, it is possible to insure the vehicle's stable and safe movement along the entire guideway without any physical contact between the vehicle and material bodies.

DETAILED DESCRIPTION

As presented for the purposes of illustration, the non-contact self-adjusting magnetic device will be described as a stabilizing device for a vehicle that is put into motion by a linear synchronous motor with variable pole pitches. Such a linear synchronous motor is described in U.S. patent application Ser. No. 583,082, now abandoned which is incorporated herein by reference. However, the invention may also be used to align the trajectory of other moving objects.

Figure 7:
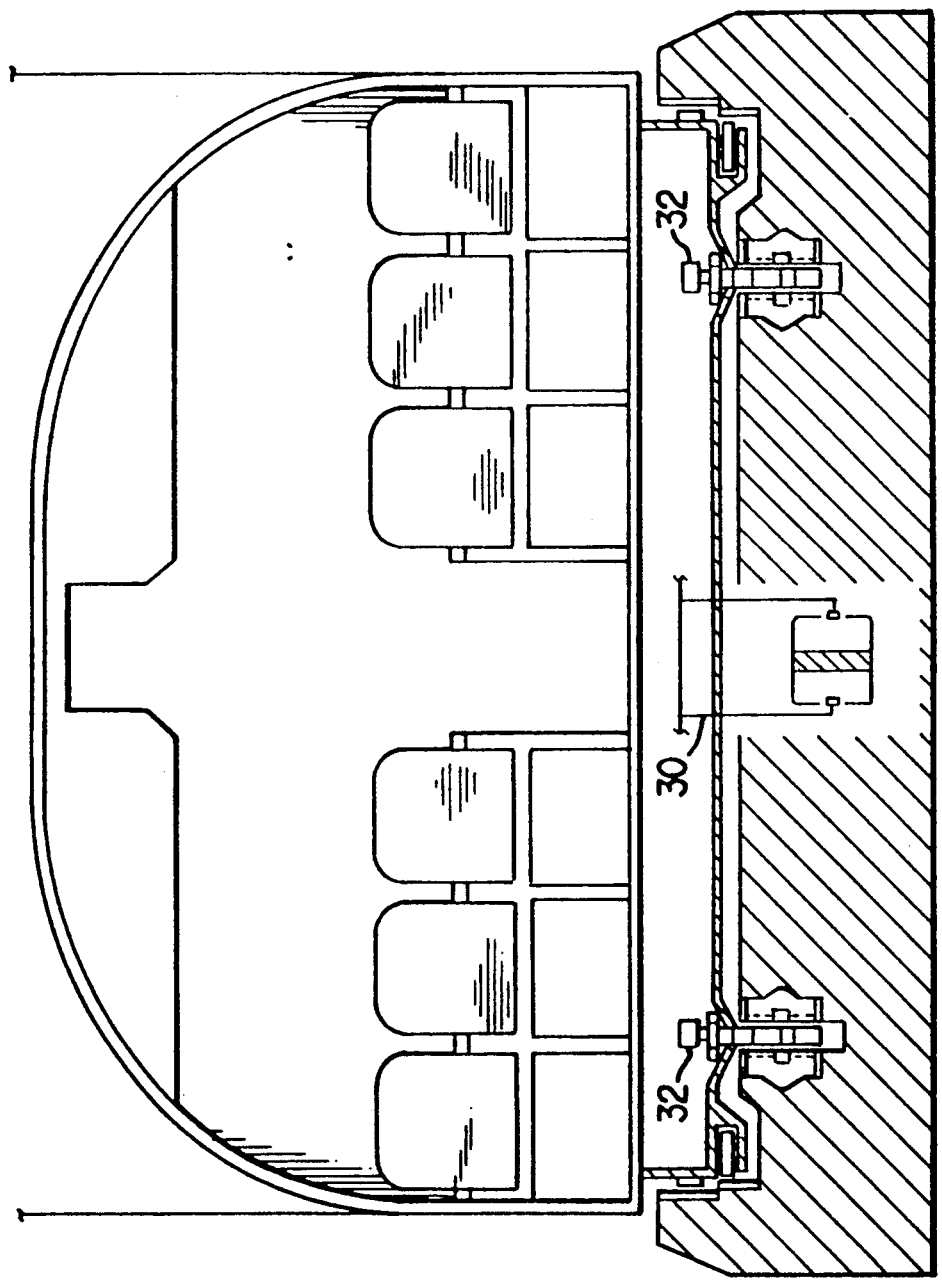
FIG. 7 is schematic, cross-sectional illustration of a vehicle incorporating the non-contact self-adjusting magnetic device of the present invention.

The non-contact self-adjusting magnetic device 30 includes a guidance device containing laminated cores 1 extending along the vehicle's entire path (i.e., the guideway), a magnetic unit 2 having permanent magnets coupled to the vehicle's undercarriage 7, and a regulating mechanism 3 to automatically regulate the magnitude of air gaps between the magnetic strips and the butt ends 20 and 22 of the steel cores 1. As seen in FIG. 7, the magnetic device 30 is located approximately at the center of the cross-sectional width of the vehicle and between the linear synchronous motors 32.

Figure 1:
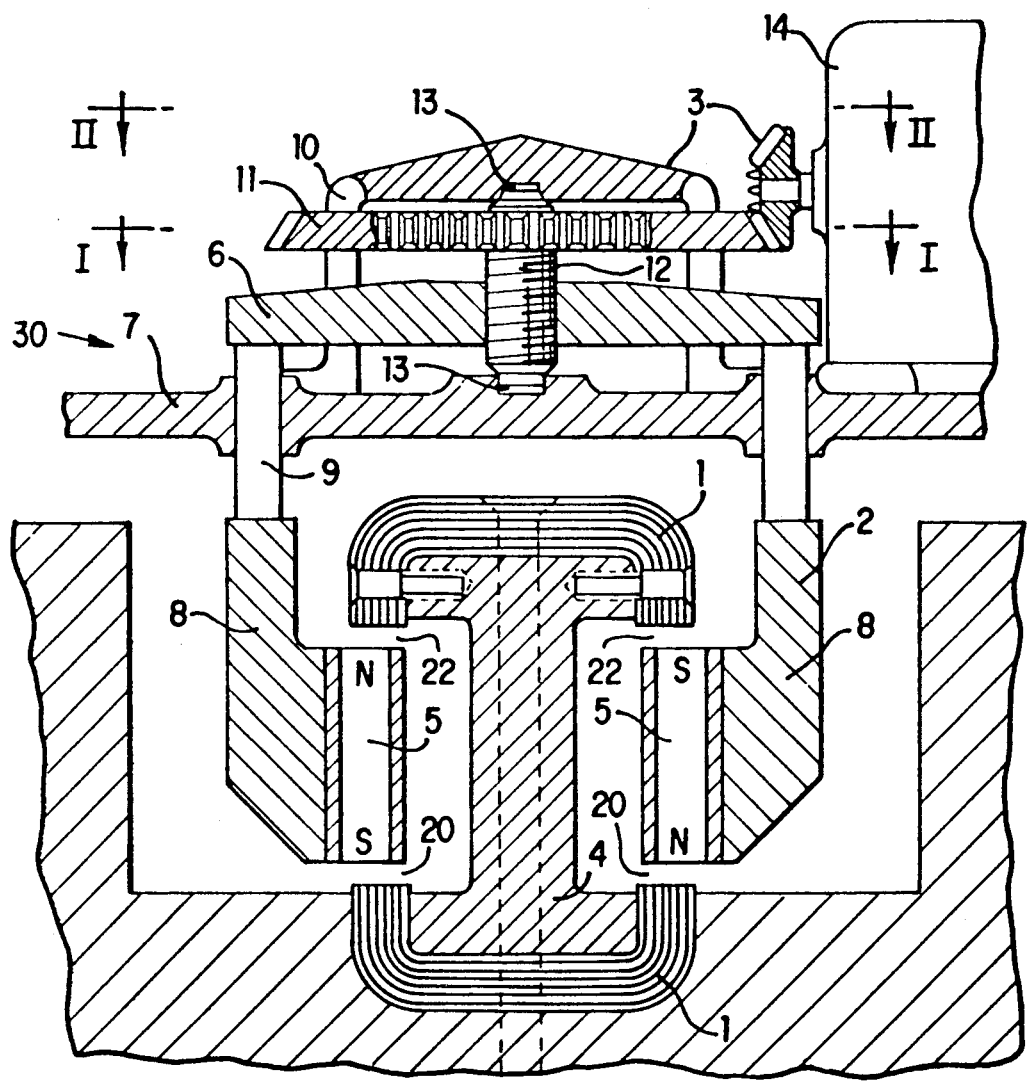
FIG. 1 is a cross-sectional, front view of the non-contact self- magnetic device for stabilizing the of a vehicle suspended in a magnetic field constructed according to the principles of the present invention.
Figure 2:
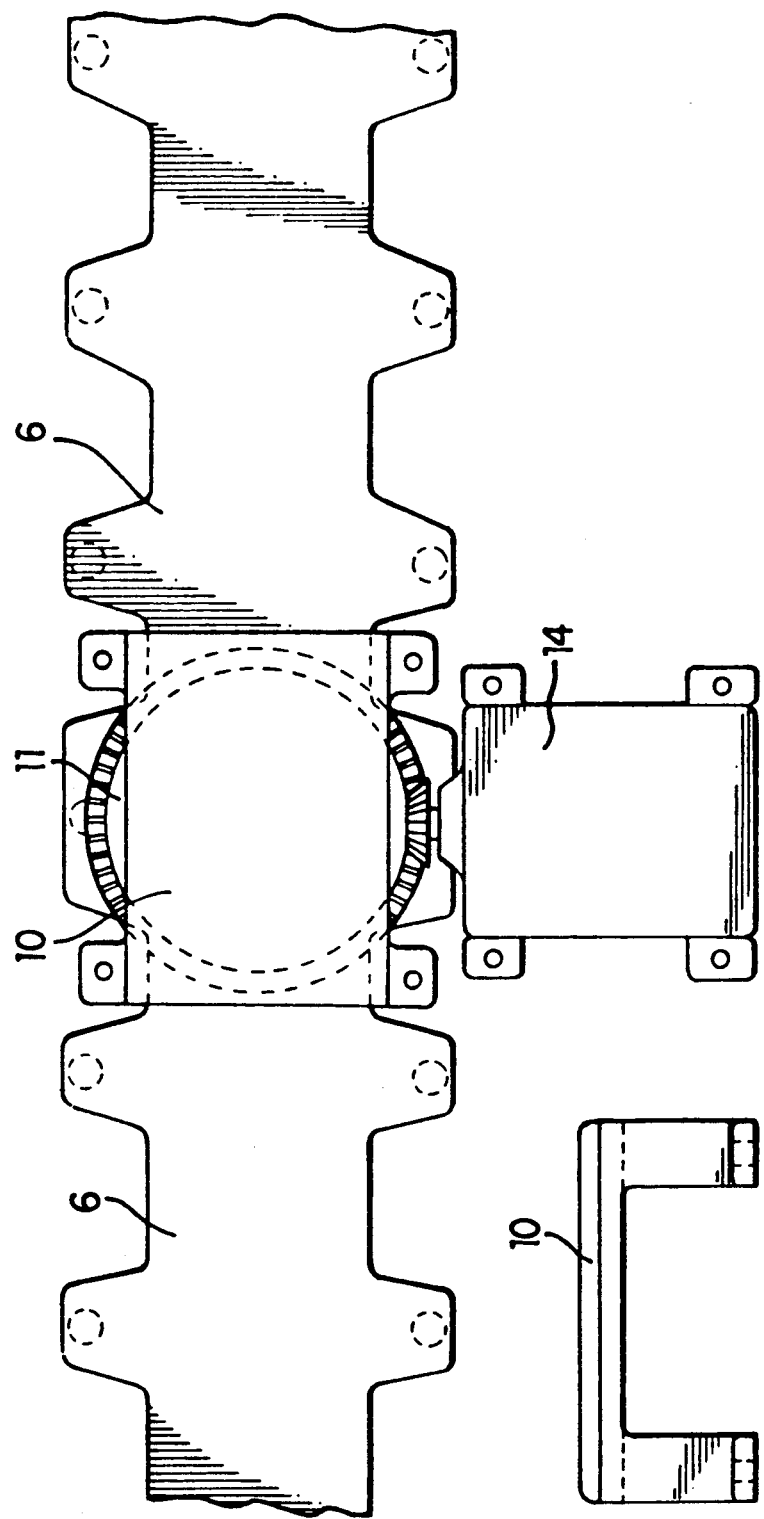
FIG. 2a plan view of the non-contact self-adjusting magnetic device taken along line II—II in FIG. 1.
FIG. 2b is a side view of the supporting lid.
Figure 3:
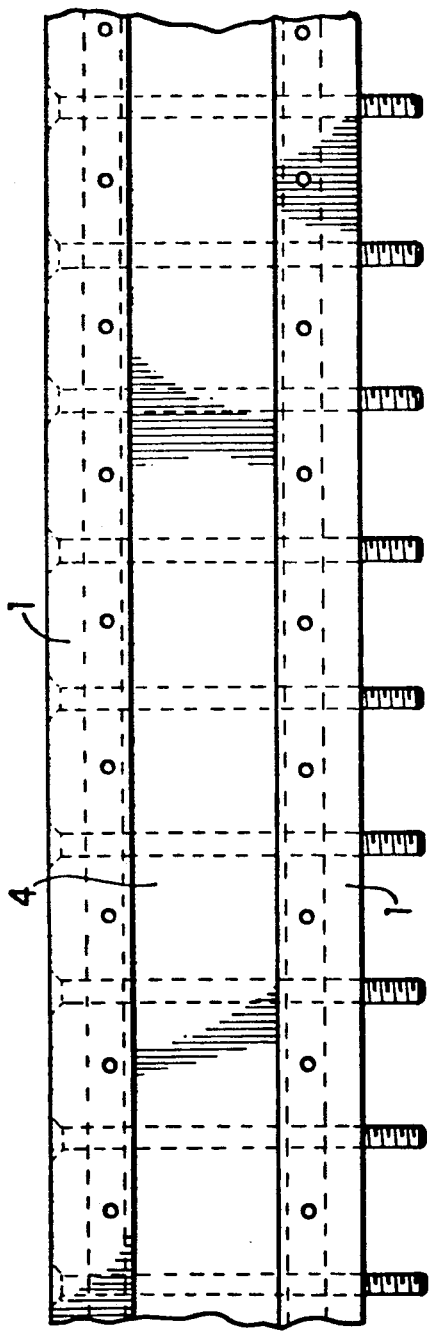
FIG. 3 is a side view of a section of the guidance device.

The guidance device 1 seen in FIG. 1 and FIG. 3 includes steel laminated cores having rectangular cross-sections with one side open. The cores are located along the entire length of the guideway. The open sides of the rectangular-shaped cores face each other and are connected by supports of non-magnetic material. The entire core assembly is attached to a concrete base. If the magnets move in the vicinity of the steel cores, demagnetizing high-density eddy currents will be induced within them. To reduce the eddy currents and their demagnetizing effects on the strength of the magnets'attraction to the cores, the cores are laminated, as shown in FIG. 1, with isolation between the sheets. The guidance device should be sufficiently strong to withstand possible disturbing forces which may act upon the vehicle during its movement.

Figure 4:
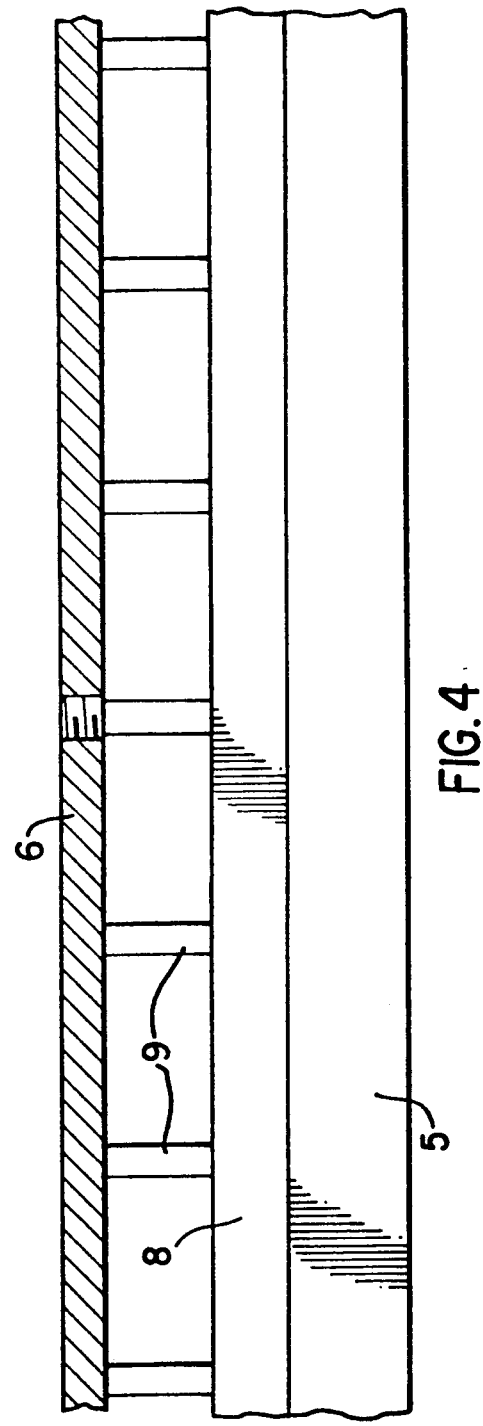
FIG. 4 is view of the magnetic unit.

The magnetic unit 2 seen in FIG. 1 and 4 creates magnetic forces which counteract any deviations of the moving vehicle from its predetermined trajectory and transfers these forces to the vehicle's undercarriage.

The magnetic unit 2 includes a steel beam 6 that extends along the undercarriage 7 and two non-magnetic holders 8 connected to the beam 6 by steel pins 9 which pass through openings in the undercarriage 7. Permanent magnets 5 are attached to the opposing butt ends of the holders 8. The magnets are formed in long strips and positioned so that their polarities are in opposing directions. The pins 9 can freely move in the vertical direction through the undercarriage openings. The pins 9 regulate the magnitude of the air gap between the butt ends 20 and 22 of the cores 1 and the magnetic strips 5 and additionally transmit stabilizing magnetic forces to the vehicle undercarriage 7.

The regulating mechanism 3 automatically regulates the differences in the vertical components of the attractive forces between the permanent magnets 5 and the steel cores 1. In other words, the regulating mechanism 3 regulates the magnitude of the air gaps between the magnetic strips 5 and the core butt ends 20 and 22.

The regulating mechanism includes support lids 10, conic gear wheels 11, and shafts 12 which are threaded and screwed into threaded openings in the steel beam 6 that are similar to a screw jack. The ends of the shafts 12 abut pressure transducers located within the cavities of the supporting lids 10 and the undercarriage 7. Transducer 13 controls the direction of movement of the pulse motors 14, which turn the conic gear wheels 11 moving the magnetic unit.

The operation of the regulating mechanism is as follows. When the vehicle's load is increased, its undercarriage shifts downward. The air gap between the magnetic strips 5 and the core butt ends 20 decreases, while the air gap between the magnetic strips 5 and the butt ends 22 increases. Consequently, there will be a corresponding change in the vertical components of the forces attracting the magnets 5 to the cores 1; the force is increased between the magnetic strips 5 and the lower cores 20 and decreased between the magnetic strips 5 and the upper cores 22. Because of the difference in the vertical forces, pressure is exerted on the lower transducer 13, and its signals will cause the pulse motor to rotate in a direction such that the shafts 12 rotate to raise the beam 6 and adjust the air gaps between the magnetic strips 5 and the core butt ends 20 and 22 until they are equalized. The regulating mechanism operates similarly when the vehicle's load is decreased.

We will now show that the non-contact self-adjusting magnetic device 30 for stabilizing the trajectory of a vehicle that is suspended in a magnetic field can align the trajectory of a vehicle, while overcoming the effects of external and internal forces which exceed in magnitude the forces attracting the magnets 5 to the cores 1.

In a linear synchronous motor with variable pole pitches such as the disclosed in U.S. patent application Ser. No. 583,082 which has been incorporated herein by reference, the propulsion magnet is in an unstable equilibrium during its movement. An inadvertent shift of the propulsion magnet toward either the left or right stator core can produce an internal destabilizing force $F_d$ attracting the propulsion magnet to the nearest core.

Figure 6B:
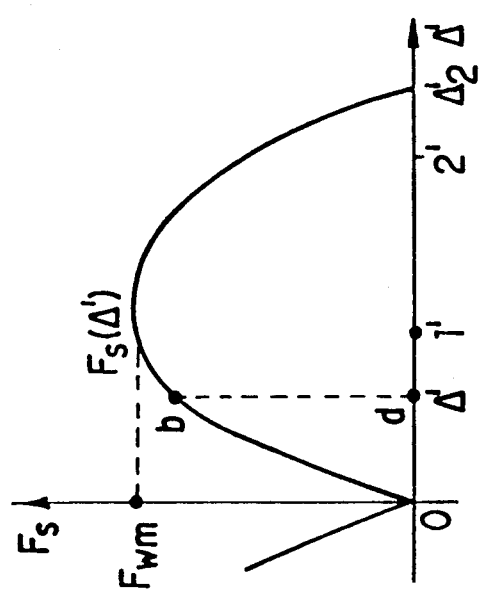
FIG. 6b is a graph of the stabilizing force which counteracts the effects of external forces.
Figure 6A:
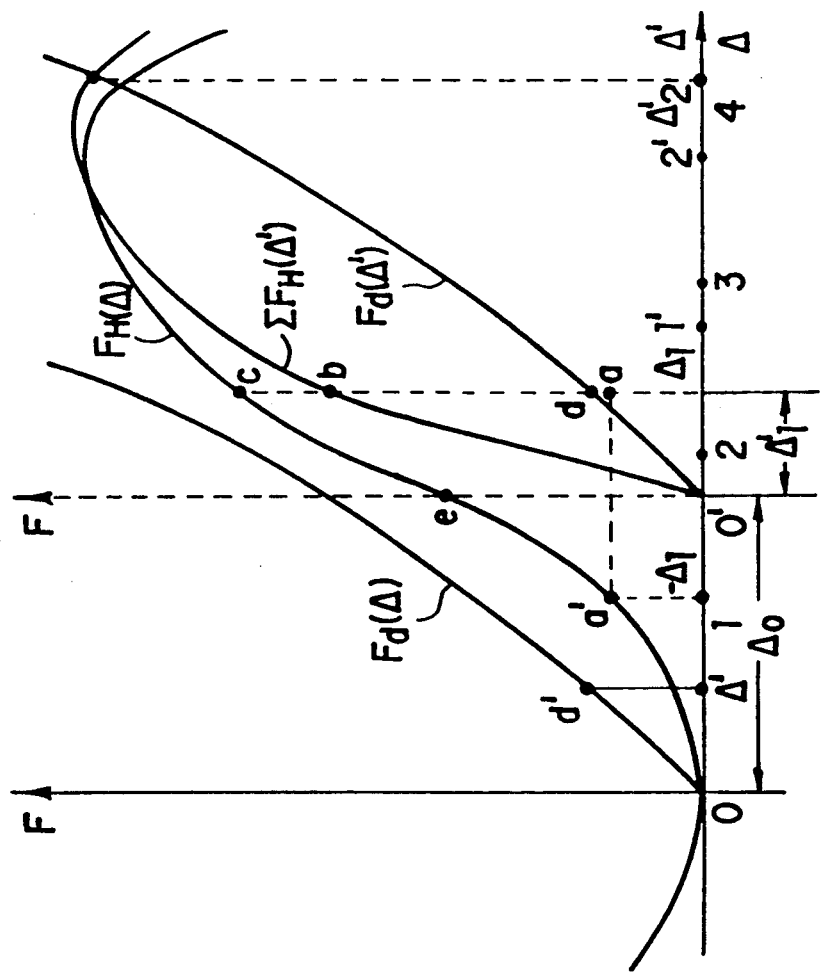
FIG. 6a is a graph of magnetic forces created in the linear synchronous motor and in the non-contact self-adjusting magnetic device as a function of the horizontal shift vehicle.

An analysis of the magnetic forces in the air gap of the linear synchronous motor has demonstrated that the dependence of the magnitude of $F_d$ on the magnitude of the inadvertent horizontal shift $\Delta$ has the form:

$$F_d(\Delta) = kB_{on}^2 \cdot \Delta \, (k = \text{const}) \tag{1}$$

where $B_{on}$ is the mean value of the normal component of the magnetic induction created by the permanent magnets of the propulsion magnet at the border of the air gap and having a length equal to one pole. The graph of this relation is shown in FIG. 6a.

Figure 5C:
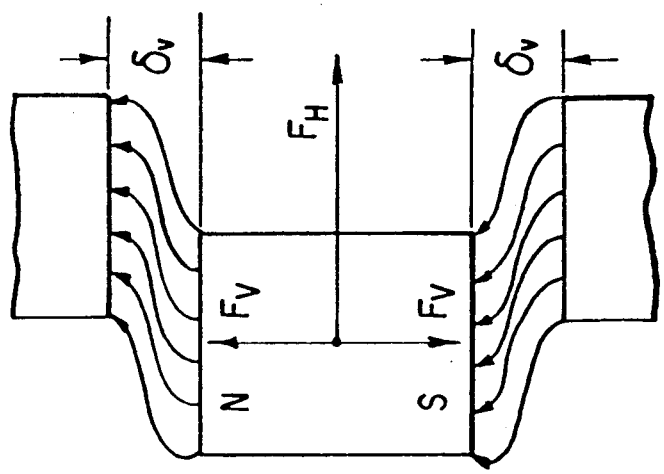
FIG. 5c is a schematic illustration of the field lines forming the horizontal force that attracts the magnets to the butt ends of the steel cores.
Figure 5B:
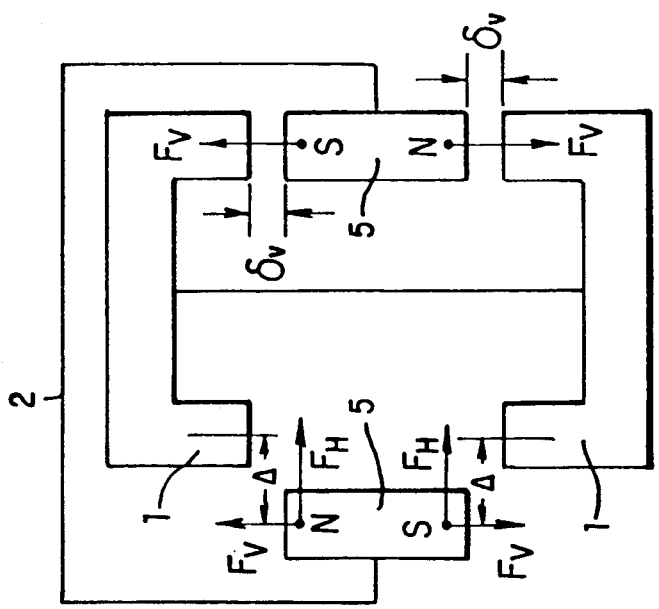
FIG. 5b is a schematic illustration of the magnetic unit when an external force is exerted on the vehicle from its side.

The shift $\Delta$ of the propulsion magnet causes an equal shift of the permanent magnet 5. This shift is illustrated in FIG. 5b. Calculations have shown that the horizontal attractive force $F_h$ as a function of the magnitude of the horizontal shift $\Delta$ between the magnet 5 and the core butt ends 20 and 22 has the form shown in FIG. 6a. FIG. 5c shows the field tubes of the magnetic field stretching longitudinally and compressing cross-sectionally which form the force $F_h$. By comparing the curves $F_d(\Delta)$ and $F_h(\Delta)$, it is seen that the result is always:

$$F_d(\Delta) \times F_h(\Delta) \qquad (2)$$

Figure 5A:
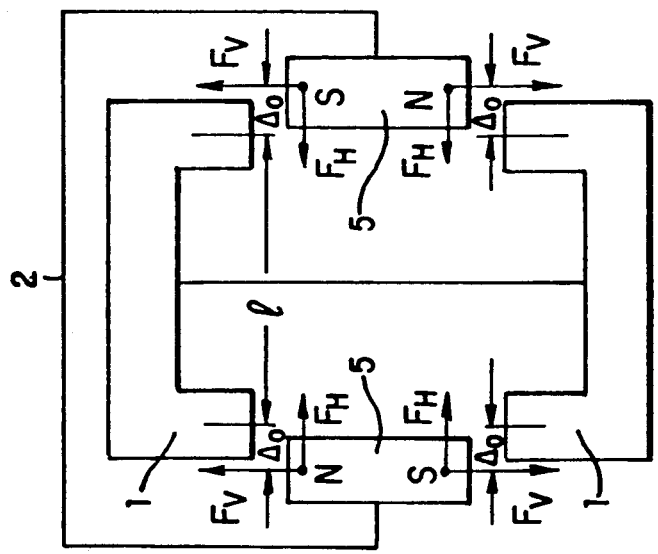
FIG. 5a is a schematic illustration of the magnetic unit showing the vertical and horizontal components of the magnetic forces.

It is necessary to find the inflection point "e" of the curve $F_h(\Delta)$ so that the shift $\Delta_0$ corresponding to this equilibrium point can be determined. As shown in FIG. 5a, the magnetic unit 2 should be configured so that the horizontal distance between the two permanent magnets 5 is greater than the distance between the butt ends 20 and 22 of each core 1 by a value of $2\Delta_0$. This configuration yields a shift of $\Delta_0$ between the centers of each of the butt ends 20 and 22 and the center of their corresponding permanent magnet 5. Then, assuming that the air gaps $\delta_v$ above and below the permanent magnets 5 are equal when there are no external forces (see FIGS. 5b and 5c), the magnetic unit 2 occupies the position shown in FIG. 5a, since only in this position will the sum of all the magnetic forces acting on it be equal to zero.

If an external pressure such as produced by wind is exerted on the vehicle from the right with an external disturbing force $F_w$, the force of the wind will shift the vehicle to the left by a distance $\Delta_1$. As a result, the external force $F_w$ will be supplemented by an internal destabilizing force $F_d(\Delta_1)$ between the propulsion magnets and the stator cores of the linear synchronous motor 32. Thus, the total disturbing force acting on the vehicle when it is deflected from its predetermined direction by a distance $\Delta_1$ is equal to the sum:

$$F_w + F_d(\Delta_1).$$

The horizontal force produced by the magnetic unit 2 which acts on the vehicle in an attempt to eliminate the shift $\Delta_1$ will now be defined. The magnitude of this force is equal to the vector sum of the forces attracting the right and the left magnetic units to the guidance cores 1:

$$\Sigma F_h(\Delta_1) = F_h(\Delta_0) - F_h(\Delta_0 - \Delta_1) \qquad (3)$$

FIG. 6a shown both the original coordinate system as well as a laterally displaced coordinate system $\Delta'$, which takes as its origin the equilibrium position $\Delta_0$ of the permanent magnets 5. The curve $F_d(\Delta)$ is shown in the new coordinate system as $F_d(\Delta')$. As seen in FIG. 6a, the value of $F_h(\Delta_0 + \Delta_1)$ is determined at point C and the value of $F_h(\Delta_0 - \Delta_1)$ is determined at point a'. Hence, $\Sigma F_h(\Delta_{1l})$ is the difference between ordinates c-a of the curve $F_h(\Delta)$. By changing $\Delta_1$ from 0 to its maximum possible value, $\Delta_m$, and calculating the ordinates $\Sigma F_h(\Delta_1)$ according to formula 3, a curve $\Sigma F_h(\Delta')$ is constructed as shown in FIG. 6a in the coordinate system $(\Delta', F)$. By comparing the transferred curve $F_d(\Delta')$ in the coordinate system $(\Delta', F)$ to the aligning force $\Sigma F_h$, it is seen that in the area $[0, \Delta'_2]$ the aligning force $\Sigma F_h$ exceeds the internal destabilizing force $F_d$:

$$\Sigma F_h(\Delta') \geq F_d)\Delta'), [0 \leq \Delta' \leq \Delta'_2] \qquad (4)$$

The force $F_s(\Delta')$ stabilizing the vehicle is equal to the difference between $\Sigma F_h(\Delta')$ and $F_d(\Delta')$. By calculating the difference in the curves $\Sigma F_h(\Delta')$ and $F_d(\Delta')$ for various values of the shift $\Delta'$ of the vehicle, a graph is plotted of the stabilizing force $F_s(\Delta')$ produced by the non-contact self-adjusting magnetic device. This curve is shown in FIG. 6b. The graph clearly shows that the device is capable of compensating for the effects of external lateral forces on the vehicle if they do not exceed a magnitude of $F_{wm}$.

In one particular embodiment of the invention, the permanent magnets 5 have a length of between 0.12 and 0.15 meters and are produced from a combination of the rare-earth elements neodymium, iron, and boron (Crumax 355). The width of the magnets 5 is approximately 0.03 meters. The steel cores 1 have a cross-sectional area of approximately 0.03 meters. The length of the air gaps when the device is in its equilibrium position is approximately 0.015 meters.

What is claimed is:

1. A magnetic apparatus for aligning the trajectory of a high-speed ground vehicle suspended in a magnetic field and moving in a predetermined direction along a guideway, said device comprising:
    a guidance device extending along said guideway determining said direction of movement of the vehicle;
    a magnetic unit having two permanent magnets each having a substantially vertical direction of magnetization that is opposite in direction to the other permanent magnet, said magnets being coupled to an undercarriage of said vehicle and generating attractive horizontal forces exerted on said guidance device which align the trajectory of the vehicle during movement, each of said permanent magnets being disposed at a position relative to said guidance device such that a maximum change in said attractive horizontal forces occurs when a horizontal deviation of the vehicle from the predetermined trajectory occurs; and
    a regulating mechanism monitoring the magnitude of vertical magnetic forces exerted on the magnetic unit, said regulating mechanism automatically reducing a difference between said vertical magnetic forces to zero.

2. The magnetic apparatus of claim 1, further comprising a plurality of magnetic units disposed along a horizontal axis of said vehicle, said horizontal axis being substantially coincident with a longitudinal axis of said vehicle.

3. The magnetic apparatus of claim 2 wherein said guidance device comprises two symmetrical steel laminated cores and a support coupling together said cores, said guidance device being affixed to a foundation of said guideway.

4. The magnetic apparatus of claim 3 wherein said permanent magnets are cylindrical in shape and said horizontal attractive forces exerted by the permanent magnets increase in magnitude as the distance between said permanent magnets and said steel cores changes.

5. A magnetic apparatus for aligning the trajectory of a high-speed ground vehicle suspended in a magnetic field and moving in a predetermined direction along a guideway, said apparatus comprising:
    a guideway core defining two symmetric air gaps between different portions of said core;
    two permanent magnets coupled to an undercarriage of said vehicle, each of said permanent magnets being disposed in one of said air gaps such that lateral attractive forces between said permanent magnets and said core are generated, said forces having a predetermined profile with respect to the horizontal distance between said permanent magnets and said core, each permanent magnet being located at an equilibrium position in said air gap defined by an inflection point of said attractive forces profile; and means for regulating vertical magnetic forces exerted on said permanent magnets such that a difference between said vertical magnetic forces is substantially reduced to zero.

6. The magnetic apparatus of claim 5 wherein said permanent magnets are cylindrical in shape and each permanent magnet has a direction of magnetization substantially opposite to the other permanent magnet.

7. The magnetic apparatus of claim 5 wherein said guideway core comprises an upper and lower core each formed by two substantially parallel elongated members coupled by a transverse member, said elongated members of said upper core being spaced apart from said elongated members of said lower core to form said air gaps therebetween.

8. The magnetic apparatus of claim 6 wherein said guideway core comprises an upper and lower core each formed by two substantially parallel elongated members coupled by a transverse member, said elongated members of said upper core being spaced apart from said elongated members of said lower core to form said air gaps therebetween.

9. The magnetic apparatus of claim 7 wherein said guideway core is formed from laminated steel and further comprises a support coupling said upper core to said lower core.

10. The magnetic apparatus of claim 8 wherein said guideway core is formed from laminated steel and further comprises a support coupling said upper core to said lower core.

11. A magnetic apparatus for aligning the trajectory of a high-speed ground vehicle suspended in a magnetic field and moving in a predetermined direction along a guideway, said apparatus comprising:

a guideway core defining two symmetric air gaps between different portions of said core, each of said air gaps having a central axis;

two permanent magnets coupled to an undercarriage of said vehicle generating magnetic forces between said permanent magnets and said core that align the trajectory of the vehicle during movement, said magnetic forces having a predetermining profile with respect to the horizontal distance between said permanent magnets and said core, each permanent magnet being cylindrically shaped and having a direction of magnetization substantially opposite to the other permanent magnet; and means for regulating vertical magnetic forces exerted on said permanent magnets such that a difference between said vertical magnetic forces is substantially reduced to zero.

12. The magnetic apparatus of claim 11 wherein each permanent magnet has a centrally disposed longitudinal axis and each of said permanent magnets is disposed in one of said air gaps such that its centrally disposed longitudinal axis is substantially parallel to the central axis of the air gap and displaced therefrom to an equilibrium position in said air gap defined by an inflection point of said attractive forces profile.

13. The magnetic apparatus of claim 11 wherein said guideway core comprises an upper and lower core each formed by two substantially parallel elongated members coupled by a transverse member, said elongated members of said upper core being spaced apart from said elongated members of said lower core to form said air gaps therebetween.

14. The magnetic apparatus of claim 12 wherein said guideway core comprises an upper and lower core each formed by two substantially parallel elongated members coupled by a transverse member, said elongated members of said upper core being spaced apart from said elongated members of said lower core to form said air gaps therebetween.

15. The magnetic apparatus of claim 11 further comprising a plurality of said two permanent magnets disposed along a horizontal axis of said vehicle, said horizontal axis being substantially coincident with a longitudinal axis of said vehicle.

16. The magnetic apparatus of claim 12 further comprising a plurality of said two permanent magnets disposed along a horizontal axis of said vehicle, said horizontal axis being substantially coincident with a longitudinal axis of said vehicle.

* * * * *

UNITED STATES PATENT AND TRADEMARK OFFICE
CERTIFICATE OF CORRECTION

PATENT NO. : 5,140,208  Page 1 of 2
DATED : August 18, 1992
INVENTOR(S) : Oleg Tozoni It is certified that error appears in the above-indentified patent and that said Letters Patent is hereby corrected as shown below:

| Column | Line | Corrections |
|--------|------|-------------|
| ABS. | 6 | Change "of which has" to --which each have--. |
| 2 | 61 | Change "self-magnetic" to --self-adjusting magnetic--; after stabilizing the" insert --trajectory--. |
| 3 | 14 | After "shift" insert --of the --. |
| 5 | 46 | Change "...$F_h(\Delta_0)$..." to --...$F_h(\Delta_0 + \Delta_1)$...--. |
| 5 | 54 | Change "$F_h(\Delta_0 - \Delta_1)$" to --$F_h(\Delta_0 - \Delta_1)$--. |
| 5 | 55 | Change "$\Sigma F_h(\Delta_{11})$" to --$\Sigma F_h(\Delta_1)$--. |
| 5 | 64 | Change "...)$\Delta'$),..." to --...($\Delta'$),...--. |

UNITED STATES PATENT AND TRADEMARK OFFICE
CERTIFICATE OF CORRECTION

PATENT NO. : 5,140,208
DATED : August 18, 1992
INVENTOR(S) : Oleg Tozoni

It is certified that error appears in the above-indentified patent and that said Letters Patent is hereby corrected as shown below:

| Column | line | |
|---|---|---|
| 8 | 3 | Change "predetermining" to --predetermined--. |

Signed and Sealed this

Seventh Day of December, 1993

Attest:

BRUCE LEHMAN

Attesting Officer     Commissioner of Patents and Trademarks